United States Patent [19]
Min et al.

[11] Patent Number: 5,728,441
[45] Date of Patent: Mar. 17, 1998

[54] RECORDABLE/REPLAYABLE OPTICAL RECORDING MEDIUM AND OPTICAL RECORDING METHOD THEREFOR

[75] Inventors: Kyung Sun Min, Kyungki-do; Young Jae Huh, Seoul; Jong Sung Kim, Sungnam, all of Rep. of Korea; Gerrit Cornelis Dubbeldam, Zevenaar, Netherlands; Freddy Gerhard Hendrikus van Wijk, Arnhem, Netherlands; Nico Maaskant, Huissen, Netherlands

[73] Assignee: Samsung Electronics Co., Ltd., Suwon, Rep. of Korea

[21] Appl. No.: 573,367

[22] Filed: Dec. 15, 1995

[30] Foreign Application Priority Data

Dec. 1, 1995 [EP] European Pat. Off. ............... 95203301
Dec. 15, 1995 [EP] European Pat. Off. ............... 95203502
Dec. 15, 1995 [KR] Rep. of Korea ........................ 95-50705

[51] Int. Cl.$^6$ ........................................................ B32B 3/00
[52] U.S. Cl. .............................. 428/64.1; 428/64.2; 428/64.4; 428/64.8; 428/457; 428/913; 430/270.12; 430/495.1; 430/945; 369/275.4; 369/283; 369/288
[58] Field of Search ............................. 428/64.1, 64.2, 428/64.4, 64.8, 457, 913; 430/270.12, 495.1, 945; 369/275.4, 283, 288

[56] References Cited

U.S. PATENT DOCUMENTS

| | | | |
|---|---|---|---|
| 4,398,203 | 8/1983 | Comet | 346/135.1 |
| 4,920,359 | 4/1990 | Arai et al. | 346/137 |
| 4,940,618 | 7/1990 | Hamada et al. | 428/64 |
| 4,973,520 | 11/1990 | Takada et al. | 428/412 |
| 4,983,440 | 1/1991 | Ikeda et al. | 428/64 |
| 4,990,388 | 2/1991 | Hamada et al. | 428/64 |
| 5,009,818 | 4/1991 | Arai et al. | 369/291 |
| 5,020,048 | 5/1991 | Arai et al. | 264/1.003 |
| 5,039,558 | 8/1991 | Imai et al. | 427/162 |
| 5,080,946 | 1/1992 | Takagisi et al. | 428/64 |
| 5,090,008 | 2/1992 | Clark et al. | 369/284 |
| 5,090,009 | 2/1992 | Hamada et al. | 369/284 |
| 5,155,723 | 10/1992 | Hamada et al. | 369/284 |
| 5,213,955 | 5/1993 | Hamada et al. | 430/270 |
| 5,318,882 | 6/1994 | Ootaguro et al. | 430/495 |
| 5,328,813 | 7/1994 | Strandjord et al. | 430/321 |
| 5,398,231 | 3/1995 | Shin et al. | 369/275.4 |
| 5,407,719 | 4/1995 | Hamada et al. | 428/64 |
| 5,409,756 | 4/1995 | Ikeda et al. | 428/64 |

FOREIGN PATENT DOCUMENTS

| | | |
|---|---|---|
| 0 130 329 | 5/1984 | European Pat. Off. . |
| 0 474 311A1 | 9/1991 | European Pat. Off. . |
| 0 536 406A1 | 2/1992 | European Pat. Off. . |
| 63-268142 | 11/1988 | Japan . |

*Primary Examiner*—Elizabeth Evans
*Attorney, Agent, or Firm*—Burns, Doane, Swecker & Mathis, L.L.P.

[57] ABSTRACT

In a recordable/replayable optical recording medium having a thin metal recording layer and an optical recording method therefor, the optical recording medium includes a substrate, a thin metal film formed on the substrate, a reflective layer arranged on the thin metal film, a buffering layer interposed between the thin metal film deformed by heat, and a protecting layer for protecting the deposited layers. Recording is facilitated by adopting a buffering layer and compatibility with conventional CD players is possible. Since expensive organic dyes are not necessary, manufacturing costs can be reduced and productivity can be greatly improved.

31 Claims, 4 Drawing Sheets

RECORDABLE/REPLAYABLE OPTICAL RECORDING MEDIUM AND OPTICAL RECORDING METHOD THEREFOR

BACKGROUND OF THE INVENTION

The present invention relates to a recordable/replayable optical recording medium, and more particularly, to a recordable/replayable compact disc (CD) having a metal or non-metal recording layer and an optical recording method therefor.

Optical mediums are widely used as a high-density recording medium since the required recording area per unit recording amount is smaller than that of a conventional magnetic recording medium. The optical recording mediums are largely classified into three types according to their functions, i.e., ROM (read-only memory) available for only replaying recorded information, WORM (write-once read many) available for recording one time only, and RW (rewritable) available for erasing and re-recording after recording. The recorded information should be replayable in a player for a ROM-type recording medium. Thus, the "Red Book" standard for ROM-type recording medium should be observed, that is, the recording medium should have a reflectivity over 70% and CNR (carrier to noise ratio) of 47 dB.

Recordable optical recording mediums reproduce information using a change in reflectivity due to physical deformation, a phase change, or a change of magnetism of a recording layer before and after recording. To be used as recording mediums compatible with CDs (compact discs), the optical recording medium should have long stability and high recording sensitivity in addition to the high reflectivity and the CNR features mentioned above. Various optical recording mediums have been proposed and partially implemented by using diverse materials to improve such features and facilitate the manufacturing of the medium.

According to Japanese Laid-Open Patent Publication No. Showa 63-268142, as shown in FIG. 1, a recording medium has a structure comprising a substrate 1, a sensitizing layer 2 made of gelatin, casein or PVA overlaying substrate 1, a thin metal film 3 of Cr, Ni, or Au having a thickness in the range of 50–500 Å overlaying the sensitizing layer 2. In such a recording medium, the thin metal film absorbs light during optical recording utilizing a laser beam and, thus, the sensitizing layer 2 and thin metal film 3 are deformed so that recording pits are formed. However, a recording medium of such a structure has difficulty in maintaining long-term stability since the recording pits are exposed.

U.S. Pat. No. 4,973,520 discloses technology purportedly for obtaining superior recording feature over 50 dB by forming a thin metal film 2a of a three-layered structure of a first thin metal film 1, a metal oxide and a second thin metal film 2, the three-layered structure superimposed on a substrate 1a as shown in FIG. 2. However, since the pits are formed on the thin metal film 2a by laser radiation thereby exposing the recording pits, recording stability also becomes inferior.

As shown in FIG. 3, U.S. Pat. No. 4,983,440 purports to compensate for such problem and discloses technology of forming two-layered thin metal film 2b and 2b' as a recording layer 2a on a substrate 1b and forming a protecting layer 4 for protecting the recording layer 2a thereon. However, the recording medium using this technology cannot be used as a medium compatible with conventional CD players since reflectivity is under 20% due to the absence of a reflective layer. A high-power light source is required if this incompatible medium is to be used in an otherwise conventional CD player.

Also, according to U.S. Pat. No. 5,039,558, as shown in FIG. 4, stability of recording pits is improved by symmetrically adhering with an adhesion layer 5 a pair of substrates 1c and 1c' on which thin metal films 2c and 2c' and protecting layers 4c and 4c' are deposited. In this method, however, the thin metal films 2c and 2c' cannot act concurrently as a reflection film and a light absorptive layer so that reflectivity does not reach 70%, even in principle.

According to U.S. Pat. No. 5,328,813, a thin metal film is provided as a recording layer on a substrate, and a solid metal oxide layer is formed thereon to enhance the long-time stability of recorded signals and reflectivity up to 40% through 60%. However, it is a problem that CNR still remains low.

Further, U.S. Pat. Nos. 4,990,388 and 5,155,723 disclose technology of forming an organic dye layer 6 as a recording layer on a substrate 1d and forming a reflection film 7 and a protecting layer 4d thereon, as shown in FIG. 5. In recording information in this medium, a dye layer absorbs a recording laser beam and generates heat to deform the substrate. Thus, information can be recognized according to change of reflectivity before and after recording in a deformed area so that compatibility with conventional CD players under the condition of over 70% reflectivity and over 47 dB CNR after recording can be available.

However, such a disc has problems including weak heat-resisting and light-resisting capabilities as well as employing expensive organic dyes. Further, the dye in a liquid state (being dissolved by an organic solvent) should be deposited on the substrate by a spin coating method. Since reflectivity sharply varies according to the thickness deviation of a coating layer, high-priced equipment which can control the thickness of the coating layer within deviation between ±3% is required, and productivity is lowered due to the accuracy requirements for the dye thickness.

SUMMARY OF THE INVENTION

To solve the above problems, it is an object of the present invention to provide a recordable/replayable optical recording medium and an optical recording method which is compatible with conventional CD players and also allows for lower manufacturing cost and high productivity.

It is another object of the present invention to provide a recordable/replayable optical recording medium and an optical recording method having a high reflectivity and recording signal, whose recording stability is improved.

Accordingly, to achieve the above objects, there is provided a recordable/replayable optical recording medium comprising: a light transmitting substrate where a pregroove for guiding light during recording is formed; a thin metal film formed on the substrate; a reflective layer disposed on recording the thin metal film; a deformable buffering layer interposed between the thin metal film and reflective layer.

Also, there is provided a method of optically recording on an optical recording medium comprising the steps of: providing a thin film on a pregroove substrate, providing a buffering layer on the thin metal recording film, heating the thin metal recording film between the pregroove substrate and the buffering layer with a recording laser beam to cause deformation on at least one of the pregroove substrate, the thin metal recording and the buffering layer, and forming pits where the deformation occurs.

Through the above-described steps, optically recordable/readable pits may be formed. Here, the pits represents portions deformed by the laser beam. The term "optically recordable/readable pits or pits" generally include optically readable or detectable marks of all kinds. Also, the deformed portions of the substrate and thin metal layer and buffering layer having different optical properties from those of undeformed portions.

The method of optically recording on an optical recording medium preferably further comprises the step of directly heating the buffering layer together with the metal layer while radiating the laser beam, by adding an organic dye which can absorb the laser beam radiated to the buffering layer.

In the optical recording medium according the present invention, it is preferable that a pregroove for guiding light is formed on the substrate during recording.

Also, the material for forming the thin metal film has a value (k) of an imaginary part of a complex refractive index preferably greater than or equal to 0.01. It is also preferable that the thickness of the thin metal layer ranges from 30 Å to 500 Å. As the material for the thin metal film, at least one metal selected from the group consisting of Au, Al, Ag, Pt, Cu, Cr, Ni, Ti, Ta and Fe, or an alloy thereof is preferably adopted.

Also, it is preferable that the thickness of the buffering layer ranges from 50 Å to 10,000 Å and the glass transition temperature ranges 60° C. to 180° C. Further, in order enhance the recording stability, an organic dye may be added to the organic material of the buffering layer in the amount of 30% or less.

BRIEF DESCRIPTION OF THE DRAWINGS

The above objects and advantages of the present invention will become more apparent by the following detailed description of preferred examples thereof with reference to the attached drawings in which.

DETAILED DESCRIPTION OF PREFERRED EMBODIMENTS

Figure 1:
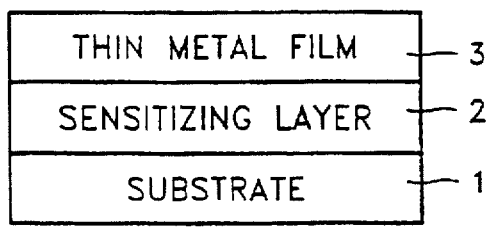
FIGS. 1 through 5 are cross-sectional views illustrating the deposition structures of conventional optical recording mediums (discs)
Figure 2:
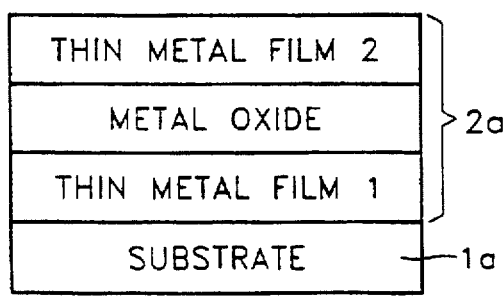
Figure 3:
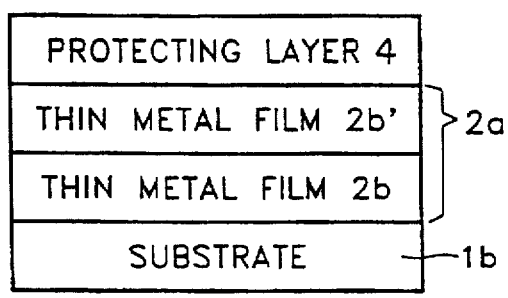
Figure 4:
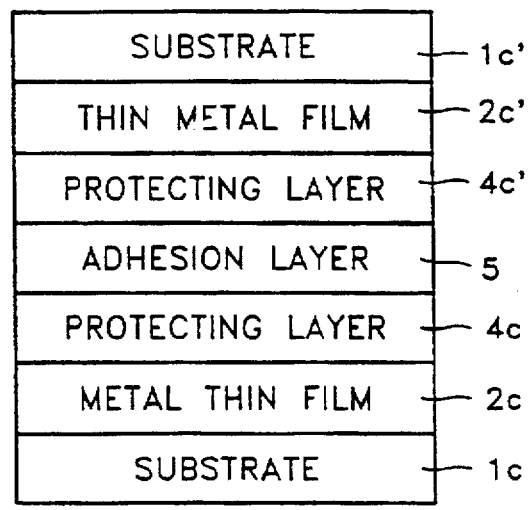
Figure 5:
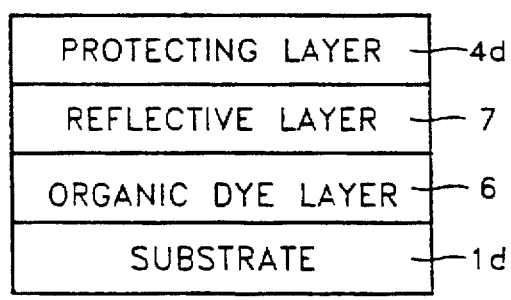
Figure 6:
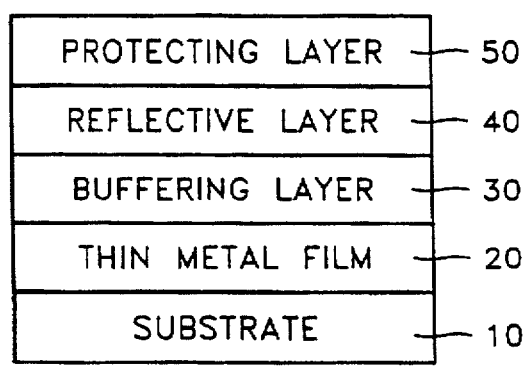
FIG. 6 is a cross-sectional view illustrating the deposition structure of an optical recording medium (disc) according to the present invention.

The optical recording medium of the present invention has a layer structure as shown in FIG. 6. A substrate 10 having a pregroove for guiding light during the recording, a thin metal recording film 20 formed on the substrate, a buffering layer 30 and a reflective layer 40 sequentially deposited on the substrate 10. A protecting layer 50 is optionally disposed on the reflective layer 40 for protecting the recording medium.

In the present invention, a concentrated recording laser beam heats the thin metal recording film 20 when optical recording is performed, and the heat is transferred to both the substrate 10 and the buffering layer 30. A portion of the substrate 10 adjacent to a portion of the heated thin metal film is deformed by an thermal expansion, and the heated portion of thin metal recording film 20 swells up into the buffering layer 30 to form a pit. When the recorded information is reproduced, a recorded portion (i.e., pit) of the substrate 10 and a deformed portion of the thin film 20 bear lower reflectivity, relative to an unrecorded portion, due to the following principles.

Figure 7:
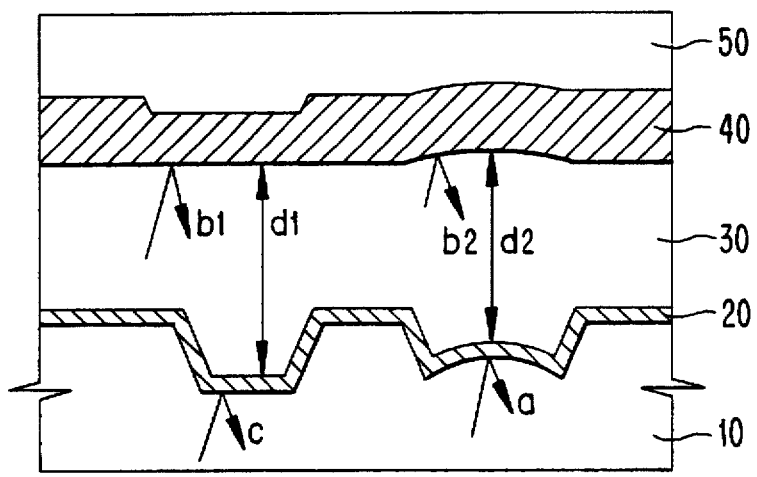
FIG. 7 is a schematic cross-sectional view illustrating the structure of a pit being a recorded portion formed on the disc according to the present invention.

First, the reflectivity is lowered due to destructive interference caused by light reflected from a boundary surface between the substrate 10 and the thin metal recording film 20, and light reflected from a boundary surface between the buffering layer 30 and the reflective layer 40. That is, as shown in FIG. 7, the thickness of the buffering layer 30 in an unrecorded portion is first determined as "$d_1$" to make light "$b_1$" reflected from the reflective layer 40 and light "c" reflected from the thin metal film 20 in a pregroove of the substrate 10 constructively interfere with one another. In a recorded portion, the substrate 10 and the thin metal film 20 swell up into the buffering layer 30 by thermal expansion and causes the buffering layer 30 to deform. Thus, the thickness of the buffering layer 30 becomes thinner, i.e., to a thickness "$d_2$" at which destructive interference takes place. Moreover, the swelling up in the buffering layer 30 also causes the reflective layer 40 to deform. Accordingly, the reflectivity is lowered due to the destructive interference caused by light "a" reflected from a boundary surface between the substrate 10 and the thin metal film 20 and light "$b_2$" reflected from a boundary surface between the buffering layer 30 and the reflective layer 40.

Figure 8:
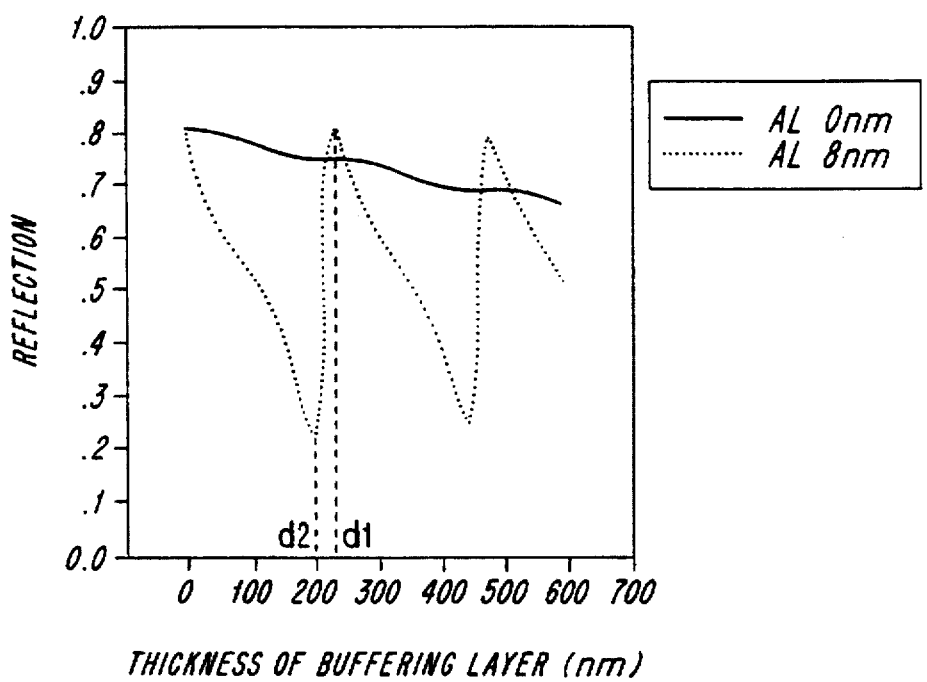
FIG. 8 is a graph illustrating the reflection variation depending on the thickness variation of a buffering layer during recording with respect to the thickness variation of a thin metal film of the disc according to the present invention.

The above phenomenon results from Fabry-Perot effect, and as shown in FIG. 8, the reflectivity of the recording medium varies according to the thickness of the buffering layer 30. Thus, the buffering layer 30 should be manufactured using materials which can be deformed as much as the thickness "$d_2$" which is suitable for destructive interference resulted from deformation of the thin metal film 20.

Second, the reflectivity drops due to scattering of incident light by the slanted and rounded walls formed in the recorded portion. That is, the substrate 10, the thin metal recording film 20 and the buffering layer 30 are deformed as shown in FIG. 7. Since there are slanted and rounded surfaces on both sides of the recorded portion, a recording beam becomes scattered at the side walls of the deformed portions of the thin metal film 20, so that reflectivity drops relative to the unrecorded portion where scattering of incident light does not occur. Accordingly, the recorded portion features lower reflectivity than an unrecorded portion, so that reproduction of recorded information can be available due to the difference of reflectivity between the recorded and unrecorded portions during playback.

Figure 11:
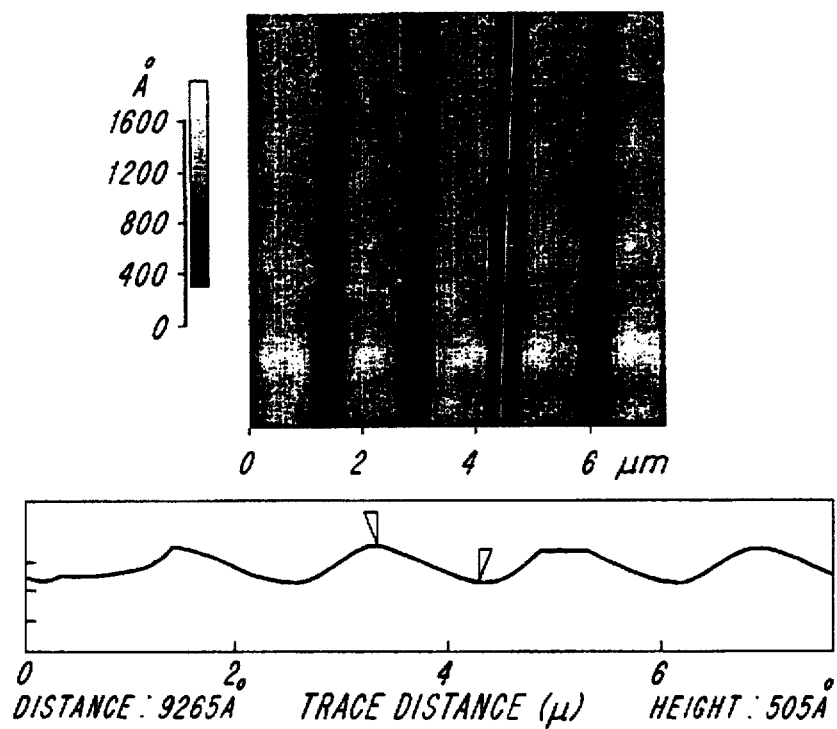
FIG. 11 is an AFM image of a substrate/thin metal layer on a recorded portion.
Figure 12:
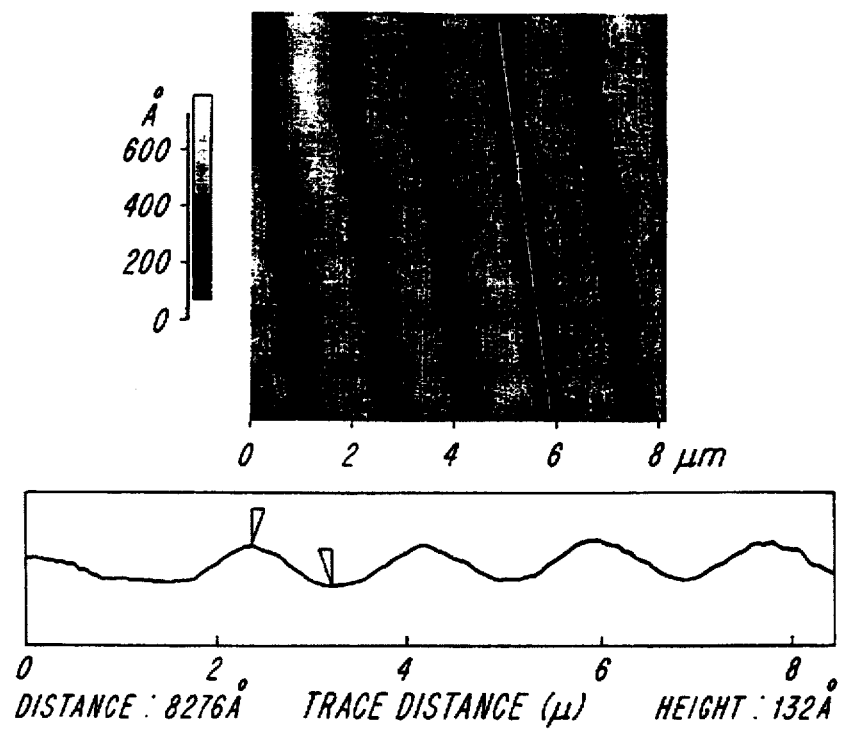
FIG. 12 is an AFM image of a buffering layer on a recorded portion.

Third, when the thin metal film 20 absorbs the incident recording beam and the absorption portion is locally heated so that the temperature rises sharply, the materials of the thin metal film 20, the adjacent substrate 10 and the buffering layer 30 are locally thermal-decomposed so that the total reflectivity is lowered causing the reflection light "a" or "$b_2$" shown in FIG. 7 to decrease. An AFM image of the deformation on substrate 10 and thin metal film 20 after removing upper layers is shown in FIG. 11. FIG. 12 shows an AFM image of the deformation on the buffering layer 30 after removing the reflective layer 40.

As described above, the disc according to the present invention allows a reflectivity of 70% or higher in a unrecorded portion by installing a reflective layer 40 on a buffering layer 30 and adjusting the thickness of the buffering layer 30 so as to make light "$b_1$" reflected from the reflective layer 40 and light "c" reflected from the thin metal film 20 constructively interfere with one another. Particularly, the Fabry-Perot effect can be maximized by adjusting the reflectivity of the buffering layer 30 by adding or not by adding dye to the buffering layer 30.

In the aforementioned disc according to the present invention, substrate 10 is transparent with respect to a laser beam and can be manufactured of polycarbonate, polymethyl-metacrylate, epoxy, polyester or amorphous polyolefin, which has excellent impact intensity and is expansible by heat. The glass transition temperature for the thermal deformation of substrate 10 ranges from 80° C. to 200° C. and is preferably 100° C. to 200° C. For guiding the laser beam during recording of information, it is necessary to form on substrate 10 a pregroove having a depth of 30 to 450 nm and a width of 0.1 to 1.2 μm.

Since the thin metal film 20 functions as a heat-generating layer for absorbing a recording laser beam and generating heat and a partial mirror for exhibiting contrast before and after recording, the absorption rate and the reflection should be constant. A suitable material has a thickness of 30 Å to 500 Å, a transmission 5 to 95% and an absorption of 5–95%. Moreover, a non-metal material can be used as a thin film/partial mirror 20 instead of a thin metal film. Non-metal materials such as silicon and its compounds like silicon nitride, silicon germanium, silica and SiO can be used.

Accordingly, as one of the optical properties of a material for forming such a thin metal or non-metal film, a complex refractive index preferably has a value (k) of an imaginary part being greater than or equal to 0.01. If k is less than 0.01, the absorption during recording is lower and a recorded portion is deformed to a lesser degree, which leads to a lower recording sensitivity. From a computer simulation, it has been determined that materials for the thin metal film or non-metal film with k values that fall within a pentagon defined by the vertices 7.15+3.93i, 7.15+5.85i, 8.96+6.28i, 9.56+5.90i and 8.14+3.77i in the n, k plane do not provide the effective recording sensitivity for a desirable recordable compact disc.

Figure 9:
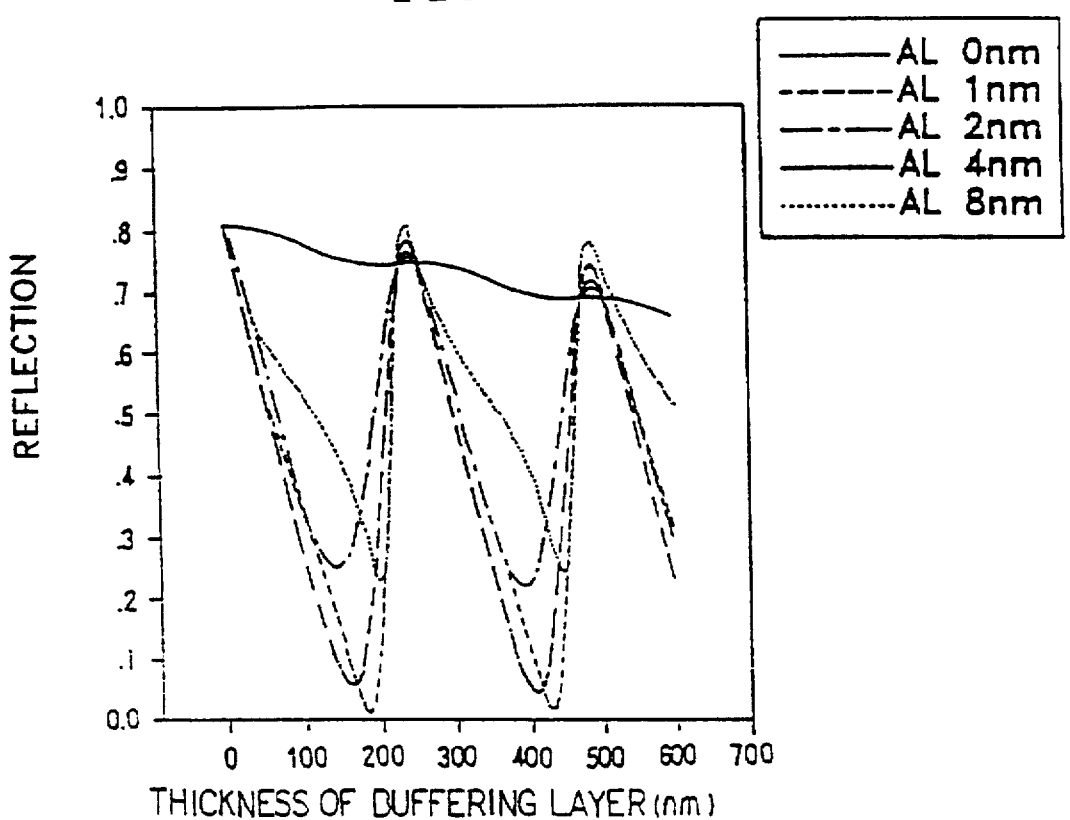
FIG. 9 is a graph illustrating the variation of reflection depending on the thickness variation of a buffering layer in the disc according to the present invention.

If the thickness of the thin metal film 20 is greater than 500 Å, recording signals become smaller for the following reasons. First, the deformation of a recorded portion becomes less due to the hindered expansion of substrate 10 by the thin metal film 20 during recording. Second, as shown in FIG. 9, the thicker the thin metal film 20 is, the smaller the reduction of the reflectivity depending on the thickness variation of the protecting layer during recording, which lowers the contrast between the recorded and the unrecorded portions.

If the thickness of the thin metal film 20 is less than 30 Å, the heat generation due to the absorption during recording becomes smaller, which makes it difficult to deform substrate 10.

Also, if the thermal conductivity of the thin metal film 20 is greater than or equal to 4 W/cm° C., heat cannot concentrate on the thin film 20 when heated during recording and heating using the laser beam but instead is rapidly transferred around the thin metal film 20 so that heating exceeding a predetermined temperature becomes difficult. Even if the heating is possible, the size of the recorded portions may be increased to reach an adjacent track. Thus, the thermal conductivity of the thin metal film should be set to 4 W/cm° C. or below.

A linear expansion coefficient of the thin metal film 20 is preferably equal to or greater than $3 \times 10^{-6}$/°C. If less than this, cracks may be generated in the thin metal film 20 by the expansion of the deformed substrate 10 during recording, thereby reducing the possibility of obtaining a uniform recording signal value.

As materials for the thin metal film 20 sufficient to fulfill the above conditions, at least one metal selected from the group consisting of Au, Al, Cr, Cu, Ni, Pt, Ag, Fe, Ti, Ta and alloys thereof can be adopted. The thin metal film 20 formed of such a material is deposited on the substrate 10 by a vacuum deposition method, an electron beam method or a sputtering method.

The buffering layer 30 for absorbing the deformation of the substrate 10 and the thin metal film 20, is easily deformed and is preferably formed of an organic material having appropriate mobility. The glass transition temperature of the buffering layer 30 preferably ranges from 60° C. to 180° C. and should be lower than that of the substrate 10. Here, if the glass transition temperature of the buffering layer 30 is lower than 60° C., the recording stability may be reduced. The buffering layer 30 formed of an organic material is dissolved in an organic solvent to then be coated by a spin coating method. At this time, a material which dissolves the organic material well but does not damage substrate should be adopted as the solvent. The thickness of the buffering layer 30 is set to have a reflectivity of 70% or higher, as shown in FIG. 9. At this time, the range of 50 to 10,000 Å is suitable.

The organic material which can be used as the buffering layer 30 includes a vinyl-alcohol resin, a vinylacetate resin, an acrylate resin, a polyester resin, a polyether resin, a polystyrene resin, an urethane resin, a cellulose resin, a fatty acid and low molecular weight organic compound. Also, copolymers of the above materials may be used as the buffering layer 30.

In order to facilitate the thermal deformation of substrate during recording, an organic dye may be added to the buffering layer 30. If the dye is added, the buffering layer 30 is also heated during recording, which makes the deformation of substrate easy. The amount of added dye should be less than 30 wt % of the buffering layer material. More than this amount of dye makes it difficult obtain a higher reflectivity. A dye that absorbs the incident light during recording is chosen depend on a short (i.e., high density optical discs) or long (i.e., low density optical discs) wavelength of the recording laser beam. Preferably, near-infrared dyes which absorb light in the wavelength range of 780 to 850 nm, or dyes which absorb light in the wavelength range of 610 to 700 nm are used. For example, cyanine, croconium, squarylium, phthalocyanine, or naphthalocyanine can be used.

The reflective layer 40 may be formed by a vacuum deposition method, an electron beam method or a sputtering method. Metals such as Au, Al, Cu, Cr, Ni, Pt, Ag, Fe, Ti, Ta and alloys thereof may be adopted as the material of the reflective layer 40, and the thickness thereof may range from 500 Å to 1500 Å.

A protecting layer 50 for protecting a recording medium can be a transparent material which has a strong impact strength and is cured by a ultraviolet (UV) rays. Epoxy or acrylate-series curing resin may be coated by a spin coating method and then is cured by the UV rays thus forming the protecting layer 50.

Although the present invention has been described as the deformation of each layer (i.e., substrate, thin metal film, buffering layer and reflective layer), it should be noted that deformation can occur in only one or two layers, depending on the laser beam power and/or the physical properties (e.g., Young's modulus, thermal conductivity, thermal expansion coefficient, glass transition temperature, etc.) of each layer. It should be noted that the thermal deformation of the thin metal film itself is uncommon due to its very high melting temperature. However, the thermal deformation of the thin metal film can occur depending on the laser beam power. For example, when the recording laser beam power is high, the thin metal recording film 20 can be melted to form a rim around the center of focused light by heating over metal melting point.

Moreover, deformation can be only in the substrate 10 if the material used for a buffering layer has stable physical properties (e.g., lower thermal expansion coefficient, higher glass transition temperature, and/or higher Young's modulus) than the material used for the substrate 10. It should be noted that deformation may occur in a thin metal film 20 and the buffering layer 30 by the heat transfer in the thin metal film 20 during laser recording. However, the deformation in the thin metal film 20 and the buffering layer 30 are so slim that it is very difficult to observe. Also, such deformation has little effect during the recording.

Furthermore, if the material used for the substrate 10 has the stable physical properties compared to the material used for the buffering layer 30, then deformation mainly occurs in the buffering layer 30. It is also possible that deformations mainly occur in both the substrate 10 and the buffering layer 30 when the material for substrate 10 and buffering layer 30 has similar physical properties.

The present invention will now be described in further detail with reference to examples. However, it should be understood that the present invention is by no means restricted to such specific examples.

EXAMPLE 1

An Al thin film of 10 nm was vacuum-deposited on a 1.2 mm thick polycarbonate substrate having a pregroove with a depth of 170 nm and a width of 0.5 µm and track pitch of 1.6 µm. A coating solution formed by dissolving 0.9 g of cyano-biphenylepoxyamine in 10 ml of diacetone alcohol was spin-coated at a rate of 2000 rpm to form a buffering layer thereon. At this time, the thickness of the buffering layer of the pregroove portion was measured by scanning electron microscopy (SEM) and the result was about 2500 Å. After drying in a vacuum oven maintaining 40° C. for four hours, Al of 1000 Å was vacuum-deposited to form a reflective layer. Epoxyacrylate UV curing resin was spin-coated thereon to then be cured, thereby fabricating a disc.

Figure 10:
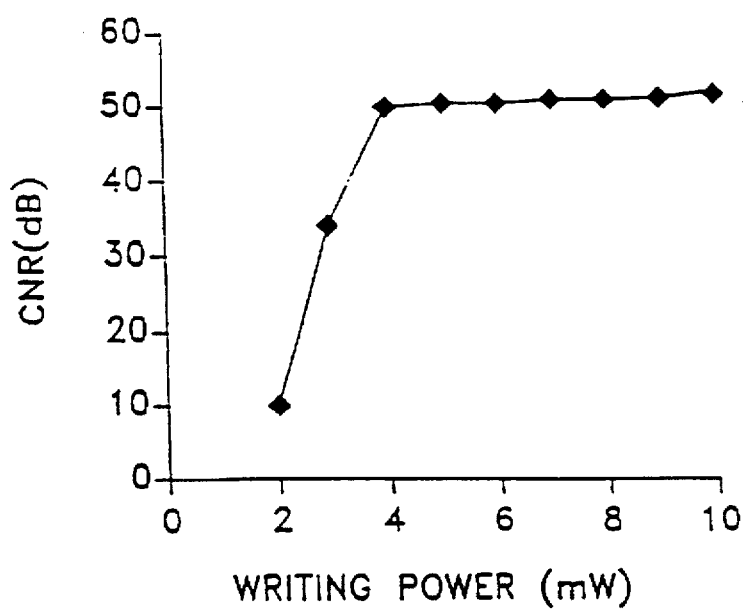
FIG. 10 is a graph illustrating the variation of writing power and CNR according to a first example of the present invention.

The disc was evaluated using an evaluation equipment adopting a laser beam of 780 nm. CNR of 51 dB and 72% reflectivity were obtained by 1.3 m/sec, 720 kHz and 8 mW recording conditions with 0.7 mW writing power. In case of recording speed of 4.8 m/sec with a writing power of 10 mW and then a CNR of 42 dB was obtained. If the writing power of the above recording conditions is changed, as shown in FIG. 10, the recorded signal having the CNR of 47 dB or higher could be reproduced at 4 mW or more. If audio recording is performed in an RP-1000 CD manufactured by Pioneer Corp., this disc was replayable in a compact disc player. Evaluation result of recording characteristics using a CD-CATS was proved to satisfy all items of CD specification.

EXAMPLES 2-3

In contrast with the first example, the thickness of Al thin film was changed into 7 nm (second example) and 12 nm (third example), respectively. However, the following processes were the same with those of Example 1, in fabricating the disc. Also, the recording evaluation was performed with the same evaluation conditions with those in the first example. The result showed that the disc made of 7 nm thin metal film had the reflectivity of 73% and CNR of 48 dB, and the disc made of 12 nm thin metal film had the reflectivity of 69% and CNR of 53 dB.

EXAMPLES 4-8

In contrast with the above examples, the metal was replaced with Au, Cu, Ag, Ni or Pt as indicated in the following table, and the disc was fabricated in the same method with that of the first example to be evaluated.

TABLE 1

| Example | Thin metal film | Reflectivity (%) | CNR (dB) |
|---------|-----------------|------------------|----------|
| 4 | Au | 72 | 50 |
| 5 | Cu | 70 | 47 |
| 6 | Ag | 69 | 50 |
| 7 | Pt | 73 | 52 |
| 8 | Ni | 73 | 52 |

EXAMPLES 9-13

In contrast with the above examples, the material of buffering layer was changed into a PMMA having Mw of 25,000, a PVA having Mw of 35,000 or a polyethyleneoxide having Mw of 32,000, all manufactured by Polyscience, or a fatty acid manufactured by Tokyo Kasei (standard kit FE M-1). The thickness of a buffering layer in a pregroove was adjusted to be 2500 Å and then the recording evaluation was performed in the same manner with that of the second example.

TABLE 2

| Example | Material of buffering layer | Reflectivity (%) | CNR (dB) |
|---------|------------------------------|------------------|----------|
| 9 | PMMA | 71 | 48 |
| 10 | PVAC | 72 | 50 |
| 11 | PVA | 71 | 49 |
| 12 | Polyethyleneoxide | 70 | 50 |
| 13 | Fatty acid | 72 | 52 |

EXAMPLE 14

In forming a buffering layer, NK125 (Nippon Kankoh Shikisho Kenkyusho Co.) was added to the buffering layer as much as 0.5 wt % of the buffering layer material. The following processes were the same with those of the example 1, in fabricating the disc. When recording was performed with the disc of 1.3 m/sec and 8 mW, CNR of 52 dB was obtained. When recording was performed 4.8 m/sec, CNR was 48 dB. Also, the reflectivity was about 70%. The disc could be used for a CD-R.

As described above, in the present invention, recording is allowed by adopting a buffering layer and a compatibility with a CD is possible. Particularly, since expensive organic dye is not used, the manufacturing cost can be reduced and the productivity can be greatly improved.

It will be appreciated by those skilled in the art that the present invention has been described by way of exemplary embodiments which are illustrative and not restrictive of the scope of the present invention. The scope of the invention is to be determined by the following appended claims.

What is claimed is:

1. An optical recording medium comprising:
   a substrate having a pregroove;
   a thin metal recording film formed on said substrate;
   a reflective layer disposed above said thin metal recording film; and
   a deformable buffering layer interposed between said thin metal recording film and said reflective layer.

2. An optical recording medium according to claim 1, further comprising a protective layer disposed on said reflective layer.

3. An optical recording medium according to claim 1, wherein at least one of said pregroove substrate, said thin metal recording film and said buffering layer have a deformation portion.

4. An optical recording medium according to claim 1, wherein said buffering layer is made of organic material.

5. An optical recording medium according to claim 4, wherein said buffering layer has a glass transition temperature within a range of 60° C. to 180° C.

6. An optical recording medium according to claim 4, wherein said buffering layer contains less than 30% organic dye.

7. An optical recording medium according to claim 1, wherein said pregroove substrate and said thin metal recording film have deformation portions and said buffering layer has a reduced thickness at said deformation portions.

8. An optical recording medium according to claim 1, wherein said pregroove substrate, said thin metal recording film and said buffering layer have deformation portions.

9. An optical recording medium according to claim 8, wherein said reflective layer has a deformation portion.

10. An optical recording medium according to claim 1, wherein said thin metal recording film has an imaginary part of the complex refractive index that is greater than or equal to 0.01.

11. An optical recording medium according to claim 1, wherein said thin metal recording film has a thickness in a range of 30 Å to 500 Å.

12. An optical recording medium according to claim 11, wherein said thin metal recording film is made of a material selected from a group consisting of Au, Ag, Al, Pt, Cu, Cr, Ni, Ti, Ta, Fe and alloys thereof.

13. An optical recording medium according to claim 1, wherein said thin metal recording film is made of a material selected from a group consisting of Au, Ag, Al, Pt, Cu, Cr, Ni, Ti, Ta, Fe and alloys thereof.

14. An optical recording medium according to claim 1, wherein said buffering layer has a thickness in a range of 50 Å to 10000 Å.

15. An optical recording medium according to claim 1, wherein said buffering layer having a deformation portion.

16. An optical recording medium according to claim 1, wherein said buffering layer contains less than 30% organic dye.

17. An optical recording medium according to claim 1, wherein said reflective layer is made of a material selected from a group consisting of Au, Ag, Al, Pt, Cu, Cr, Ni, Ti, Ta, Fe and alloys thereof.

18. An optical recording medium according to claim 1, wherein said thin metal recording film has a thermal conductivity of no more than 4 W/cm° C.

19. An optical recording medium according to claim 1, wherein said substrate has a deformation portion.

20. A method of optically recording on an optical recording medium comprising the steps of:
    providing a thin metal recording film on a pregroove substrate;
    providing a buffering layer on said thin metal recording film; and
    heating said thin metal recording film between said pregroove substrate and said buffering layer with a laser beam to cause deformation in at least one of said pregroove substrate, said thin metal recording film and said buffering layer, whereby forming pits where the deformation occurs.

21. A method of optically recording on an optical recording medium as claimed in claim 20, Wherein said step of heating said thin metal recording film further comprises a step of:
    deforming said buffering layer, said thin metal recording film and said pregroove substrate.

22. A method of optically recording on an optical recording medium as claimed in claim 21, further comprising the step of
    deforming a reflective layer on said buffering layer.

23. A method of optically recording on an optical recording medium as claimed in claim 20, further comprises the step of:
    providing a reflective layer on said buffering layer.

24. A method of optically recording on an optical recording medium as claimed in claim 23, further comprises the step of:
    providing a protecting layer on said reflective layer.

25. A method of optically recording on an optical recording medium as claimed in claim 20, wherein said buffering layer is made of organic material.

26. A method of optically recording on an optical recording medium as claimed in claim 20, wherein said thin metal recording film is made of a material selected from a group consisting of Au, Al, Ag, Pt, Cu, Cr, Ni, Ti, Ta, Fe and alloys thereof.

27. A method of optically recording on an optical recording medium as claimed in claim 20, wherein said buffering layer has a glass transition temperature ranging from 60° C. to 180° C.

28. A method of optically recording on an optical recording medium as claimed in claim 20, further comprises the step of:
    adding an organic dye to said buffering layer.

29. A method of optically recording on an optical recording medium as claimed in claim 20, wherein said buffering layer contains less than 30% organic dye.

30. A method of optically recording on an optical recording medium as claimed in claim 20, wherein said thin metal recording film has a thermal conductivity of no more than 4 W/cm° C.

31. A method of optically recording on an optical recording medium as claimed in claim 20, wherein said step of heating a thin metal recording film further comprises the step of:
    deforming said buffering layer.

* * * * *

UNITED STATES PATENT AND TRADEMARK OFFICE
CERTIFICATE OF CORRECTION

PATENT NO. : 5,728,441
DATED : March 17, 1998
INVENTOR(S) : Kyung Sun Min et al.

It is certified that error appears in the above-identified patent and that said Letters Patent is hereby corrected as shown below:

On title page,
  Correct the Assignee to read as follows:

-- [73] Assignee: Samsung Electronics Co., Ltd.,
                  Suwon, Republic of Korea; and
                  Akzo Nobel, N.V., Arnhem, The Netherlands --.

Signed and Sealed this

Tenth Day of November 1998

Attest:

BRUCE LEHMAN

*Attesting Officer*    *Commissioner of Patents and Trademarks*